United States Patent
Fayad et al.

(10) Patent No.: US 7,957,369 B2
(45) Date of Patent: *Jun. 7, 2011

(54) METHODS AND APPARATUS FOR DATA COMMUNICATIONS THROUGH PACKET NETWORKS

(75) Inventors: Gilles G. Fayad, Corona Del Mar, CA (US); Joel D. Peshkin, Irvine, CA (US); James W. Johnston, Rancho Santa Margarita, CA (US); Paul C. Wren, Valbonne (FR)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 12/660,469

(22) Filed: Feb. 26, 2010

(65) Prior Publication Data

US 2010/0158027 A1    Jun. 24, 2010

Related U.S. Application Data

(63) Continuation of application No. 10/806,800, filed on Mar. 23, 2004, now Pat. No. 7,697,539, which is a continuation of application No. 09/547,119, filed on Apr. 11, 2000, now Pat. No. 6,757,250.

(60) Provisional application No. 60/128,844, filed on Apr. 12, 1999, provisional application No. 60/130,416, filed on Apr. 21, 1999.

(51) Int. Cl.
*H04L 12/66* (2006.01)

(52) U.S. Cl. ........................ 370/352; 370/353; 370/401

(58) Field of Classification Search .................. 370/222, 370/244, 352, 353, 355, 380, 395.2, 401, 370/402, 427, 435, 442, 463, 466, 498, 503, 370/507, 510, 512, 513, 514, 515, 535; 379/91.01, 379/88.25, 85.13, 88.17, 89
See application file for complete search history.

(56) References Cited

U.S. PATENT DOCUMENTS

| | | | |
|---|---|---|---|
| 5,168,446 A | 12/1992 | Wiseman | |
| 5,267,263 A | 11/1993 | Feezel | |
| 5,287,103 A | 2/1994 | Kasprzyk | |
| 5,375,068 A | 12/1994 | Palmer | |
| 5,410,754 A | 4/1995 | Klotzbach | |
| 5,412,660 A * | 5/1995 | Chen et al. | 370/318 |
| 5,438,614 A * | 8/1995 | Rozman et al. | 379/93.08 |
| 5,541,955 A | 7/1996 | Jacobsmeyer | |
| 5,732,219 A | 3/1998 | Blumer | |
| 5,748,628 A * | 5/1998 | Ericson et al. | 370/384 |
| 5,781,726 A * | 7/1998 | Pereira | 709/200 |

(Continued)

*Primary Examiner* — Aung S Moe
*Assistant Examiner* — Abdullah Riyami
(74) *Attorney, Agent, or Firm* — Farjami & Farjami LLP

(57) ABSTRACT

An improved data communication technique may be employed with modems through a packet network. The disclosed technique facilitates a virtual end-to-end connection between two modems such that the two modems can effectively behave as if directly connected to each other, unaware of any modifications to the data being transferred or to the protocols configured within the communication connection. Preferably, a data communication system for carrying out the communication technique demodulates data coming from a first modem, transports the demodulated data in packets between two gateways, and then remodulates the data before delivering to a second modem at the other end. In accordance with various aspects of the present invention, various alternatives for calling and quality of service set-up mechanisms, the establishment of a communication session, the transport of data during a communication session, the flow control between all system components involved, and the mechanisms for the termination of communications are also provided.

18 Claims, 6 Drawing Sheets

U.S. PATENT DOCUMENTS

| | | | |
|---|---|---|---|
| 5,822,328 A * | 10/1998 | Derby et al. ................. 370/507 |
| 5,852,631 A * | 12/1998 | Scott ........................... 375/222 |
| 5,861,810 A | 1/1999 | Nguyen |
| 5,878,120 A * | 3/1999 | O'Mahony ................ 379/93.09 |
| 5,923,659 A | 7/1999 | Curry |
| 5,946,347 A | 8/1999 | Hudson |
| 5,956,391 A | 9/1999 | Melen |
| 6,038,222 A * | 3/2000 | Osler et al. .................. 370/282 |
| 6,049,902 A * | 4/2000 | Davis et al. .................. 714/748 |
| 6,058,110 A | 5/2000 | Bellenger |
| 6,061,728 A * | 5/2000 | Mead et al. .................. 709/227 |
| 6,085,252 A | 7/2000 | Zhu |
| 6,105,068 A | 8/2000 | Naudus |
| 6,130,880 A | 10/2000 | Naudus |
| 6,198,738 B1 | 3/2001 | Chang |
| 6,205,121 B1 * | 3/2001 | Heuer ......................... 370/250 |
| 6,219,413 B1 | 4/2001 | Burg |
| 6,266,340 B1 * | 7/2001 | Pickett et al. ................ 370/442 |
| 6,292,484 B1 | 9/2001 | Oliver |
| 6,360,269 B1 | 3/2002 | Mamros |
| 6,374,288 B1 | 4/2002 | Bhagavath |
| 6,377,570 B1 | 4/2002 | Vaziri |
| 6,381,038 B1 * | 4/2002 | Endo ............................ 358/400 |
| 6,396,911 B1 | 5/2002 | Kostan |
| 6,407,996 B1 | 6/2002 | Witchalls |
| 6,421,317 B1 * | 7/2002 | Denecheau et al. ......... 370/222 |
| 6,434,169 B1 | 8/2002 | Verreault |
| 6,438,218 B1 * | 8/2002 | Farris et al. ................ 379/88.17 |
| 6,490,618 B1 * | 12/2002 | Ferguson et al. ............. 709/223 |
| 6,504,838 B1 | 1/2003 | Kwan |
| 6,621,346 B1 | 9/2003 | Nabicht |
| 6,636,519 B1 * | 10/2003 | Walsh et al. .................. 370/401 |
| 6,667,972 B1 | 12/2003 | Foltan |
| 6,829,231 B1 | 12/2004 | Wilson |
| 6,850,518 B1 * | 2/2005 | Khanna ........................ 370/389 |
| 6,868,081 B1 | 3/2005 | Akram |
| 6,965,600 B2 | 11/2005 | George |
| 6,985,492 B1 | 1/2006 | Thi |
| 7,023,868 B2 | 4/2006 | Rabenko |
| 7,113,501 B2 | 9/2006 | Garakani |
| 7,263,107 B1 | 8/2007 | Johnston |
| 2001/0024439 A1 | 9/2001 | Morgan |
| 2001/0033583 A1 | 10/2001 | Rabenko |
| 2001/0046259 A1 * | 11/2001 | Abrishami .................... 375/222 |
| 2002/0049745 A1 | 4/2002 | Yuichiro |
| 2002/0061012 A1 | 5/2002 | Thi |
| 2002/0064137 A1 * | 5/2002 | Garakani et al. ............. 370/278 |
| 2004/0174880 A1 | 9/2004 | White |
| 2005/0008023 A1 * | 1/2005 | Melhorn ....................... 370/401 |
| 2005/0286418 A1 * | 12/2005 | Rasanen ....................... 370/230 |
| 2007/0073805 A1 | 3/2007 | Jorgensen |

* cited by examiner

METHODS AND APPARATUS FOR DATA COMMUNICATIONS THROUGH PACKET NETWORKS

CROSS-REFERENCES TO RELATED APPLICATIONS

This application is a continuation of U.S. application Ser. No. 10/806,800, filed on Mar. 23, 2004 now U.S. Pat. No. 7,697,539, which is a continuation of U.S. application Ser. No. 09/547,119, filed on Apr. 11, 2000, now U.S. Pat. No. 6,757,250, which claims priority of prior pending U.S. Provisional Application No. 60/128,844, filed on Apr. 12, 1999 and prior pending U.S. Provisional Application No. 60/130,416, filed on Apr. 21, 1999.

FIELD OF THE INVENTION

The present invention relates to data communication systems. More particularly, the present invention relates to the transmission of data through packet networks.

BACKGROUND OF THE INVENTION

The current trend of using packet networks (PN) to transport data traditionally carried over circuit switched networks such as the Public Switched Telephone Network (PSTN) has created a need to support the installed-base of terminals attached to the PSTN. FIG. 1 illustrates a traditional PSTN environment as well as the interlace to a PN substitute network, as may be used with various customer premise equipment, such as telephones, fax machines, and modems.

The different nature between the two types of networks may be related to different operating characteristics such as bandwidth, delay, variations in delay, and loss of information, e.g., packet loss. The differences in characteristics between these networks can affect the terminals that have been designed with PSTN characteristics in mind, if and when those terminals need to communicate over a packet network. For example, many terminals are delay sensitive, and their interactive behavior with other components has been designed in consideration of the delay characteristics of the network in use at the time of their inception, typically, the PSTN. Further, it should also be appreciated that data communication networks need not exclusively include a packet network or a PSTN. For example, future networks may include portions of their infrastructure provided by one or the other type of network, as depicted in FIG. 2.

Hence, there is a need for the ubiquitous support of the installed-base of terminals on both networks. This support may involve the providing of new mechanisms to facilitate the communication of traditional devices over packet networks. Support for these devices can depend on several factors, including the transported media characteristics, and thus can dictate the needs for a real-time infrastructure, such as voice communications, versus a non-real-time infrastructure, such as fax communications. Further, support for these devices can dictate the needs for a transparent support mode, i.e., one by which the actual data is transported transparently over the existing voice packet network infrastructure, versus a demodulation/remodulation support mode, where the information is demodulated, transported, and then remodulated.

As described above, the transport of data over a packet network may be subject to variation of delay, also known as jitter, as well as to packet loss characteristics, for example, during the establishment of a communication session, or during actual data transfer. Further, at the end of a communication session, once a terminal device decides to terminate a communication session, problems can occur in the tearing down of any remaining communication links. Accordingly, although some support mechanisms have been devised recently for the transport of voice and fax communications, a strong need exists for resolving various other issues relating to modem communication sessions, such as those related to the call numbering, establishment, transport and termination features.

SUMMARY OF THE INVENTION

The disclosed techniques for data communication may be employed with modems through a packet network. Further, the data communication techniques facilitate a virtual end-to-end connection between a first modem and a second modem such that the two modems can effectively behave as if directly connected to each other, unaware of any modifications to the data being transferred or to the protocols utilized within the communication connection. The above techniques can be carried out in a data communication system having, in addition to the modems, at least two gateways corresponding to the modems to facilitate the modem-to-modem communications through the packet network. During operation, the first modem will contact a corresponding first gateway regarding its intent to contact the second modem. After being contacted, the first gateway will suitably contact a second gateway corresponding to the second modem, which may establish a communication link between the second gateway and second modem. Additionally, negotiations can occur between the various gateways and modems to establish a communication session wherein the gateways can act in proxy for the two modems. Preferably, the communication system demodulates data coming from a first modem, transports the demodulated data in packets between the two gateways, and remodulates the data before delivering it to a second modem. Accordingly, data is transferred between the two modems through the virtual end-to-end communication connection.

In accordance with one aspect of the present invention, solutions for problems caused by the delays and the packet loss characteristics such as may be incurred for call establishment over a packet network, as well as for call numbering and calling options, are provided.

Further, in accordance with another aspect of the present invention, mechanisms such as end-to-end error detection, correction and re-transmission are provided to alleviate problems of flow control, such as variation of delay, i.e., jitter, and packet loss, which may occur during the transport of data over a packet network.

In accordance with yet another aspect of the present invention, solutions for facilitating termination at the end of a communication session are provided.

BRIEF DESCRIPTION OF THE DRAWINGS

A more complete understanding of the present invention may be derived by referring to the detailed description when considered in connection with the Figures, where references to symbols, devices and components and the like refer to similar elements throughout the Figures, and.

DETAILED DESCRIPTION OF PREFERRED EMBODIMENTS OF THE INVENTION

The present invention may be described herein in terms of functional blocks or components and various processing steps. It should be appreciated that such functional blocks or components may be realized by any number of hardware and software components configured to perform the specified functions. For example, the present invention may employ various integrated circuit components, e.g., memory elements, digital signal processing elements, transistors, amplifiers and the like, which may carry out a variety of functions under the control of one or more microprocessors or other control devices. Software components may consist of specific modulations, protocols, and variations thereof, which may carry out a variety of functions. In addition, those skilled in the art will appreciate that the present invention may be practiced in any number of data communication contexts and that the communication system described herein is merely one exemplary application for the invention. Further, it should be noted that the present invention may employ any number of conventional techniques for call signaling, data transmission, signal processing and conditioning, and the like. Such general techniques that may be known to those skilled in the art are not described in detail herein.

Figure 1:
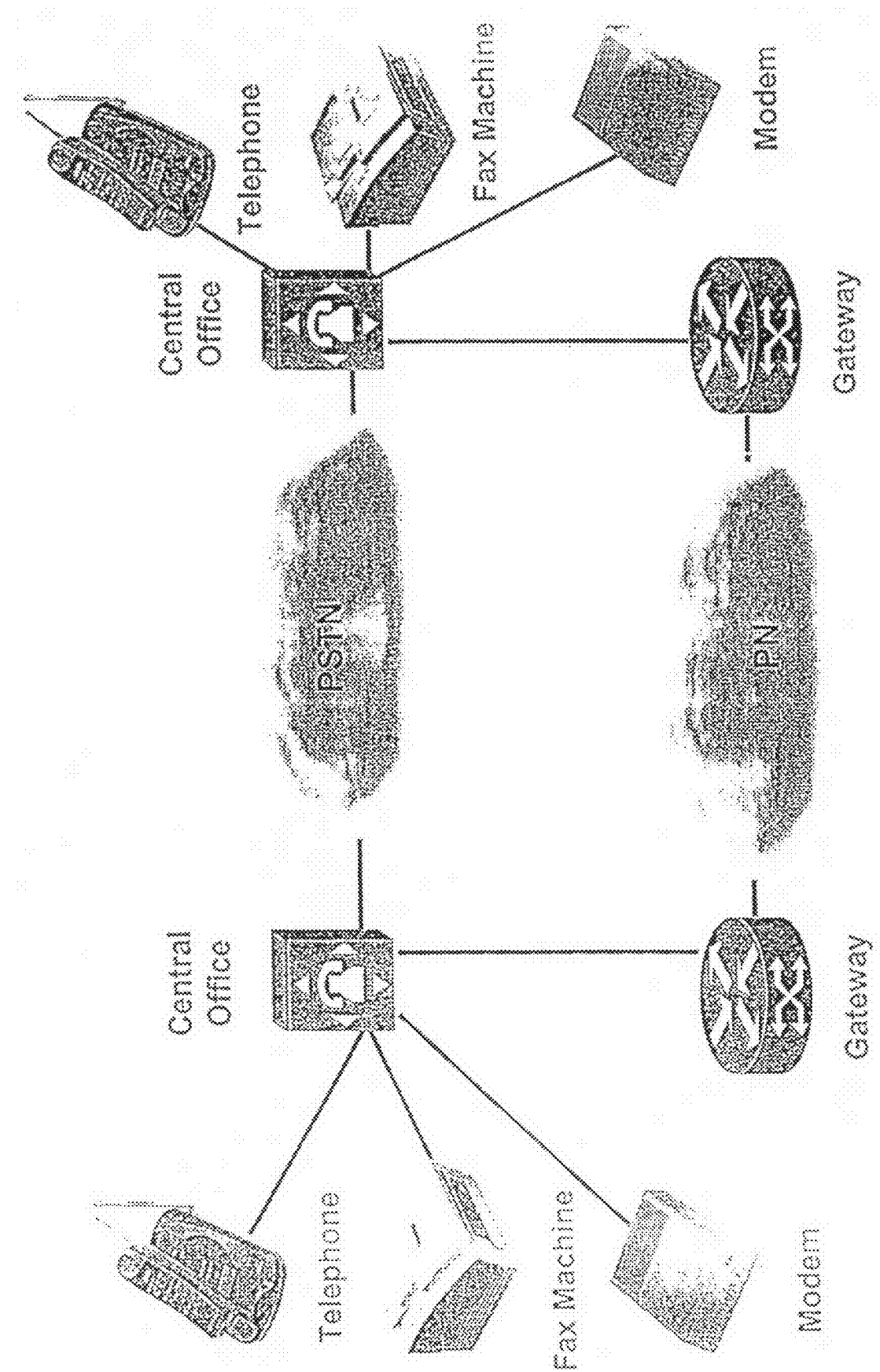
FIG. 1 is a schematic representation of a traditional PSTN incorporated with a packet network infrastructure associated with installed-based PSTN terminals.
Figure 2:
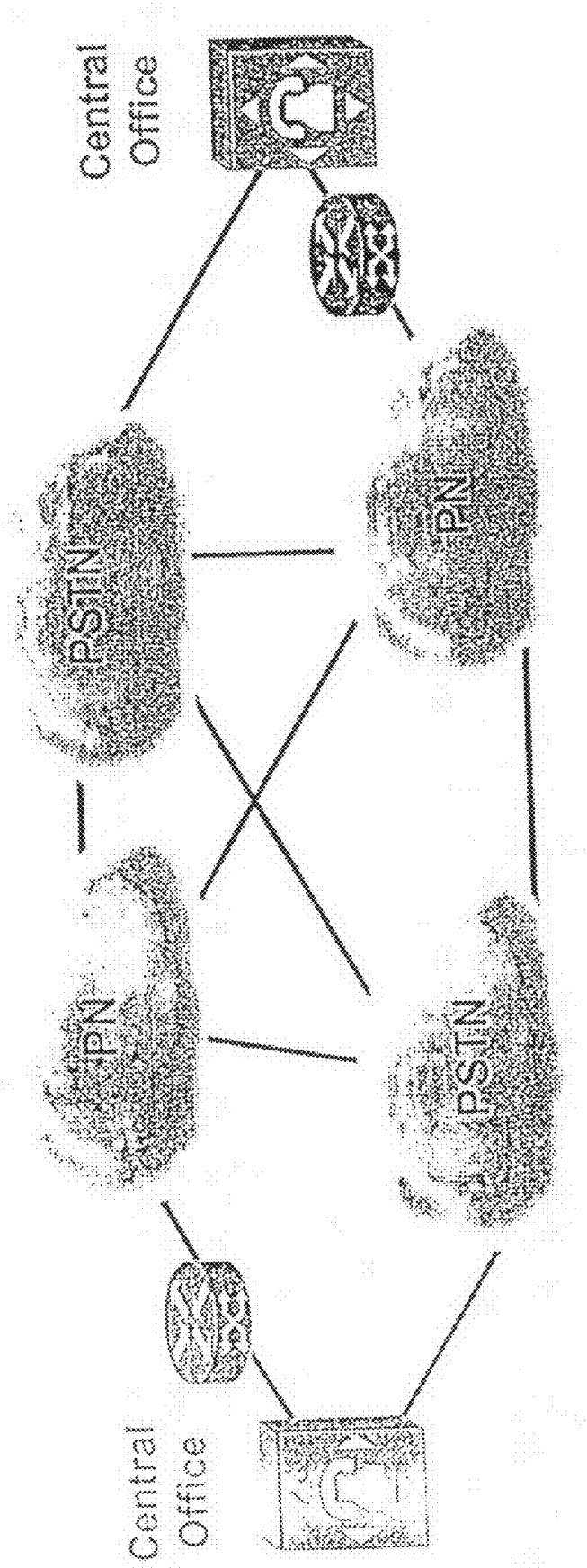
FIG. 2 is a schematic representation of an exemplary heterogeneous network of PSTN and PN elements.
Figure 3:
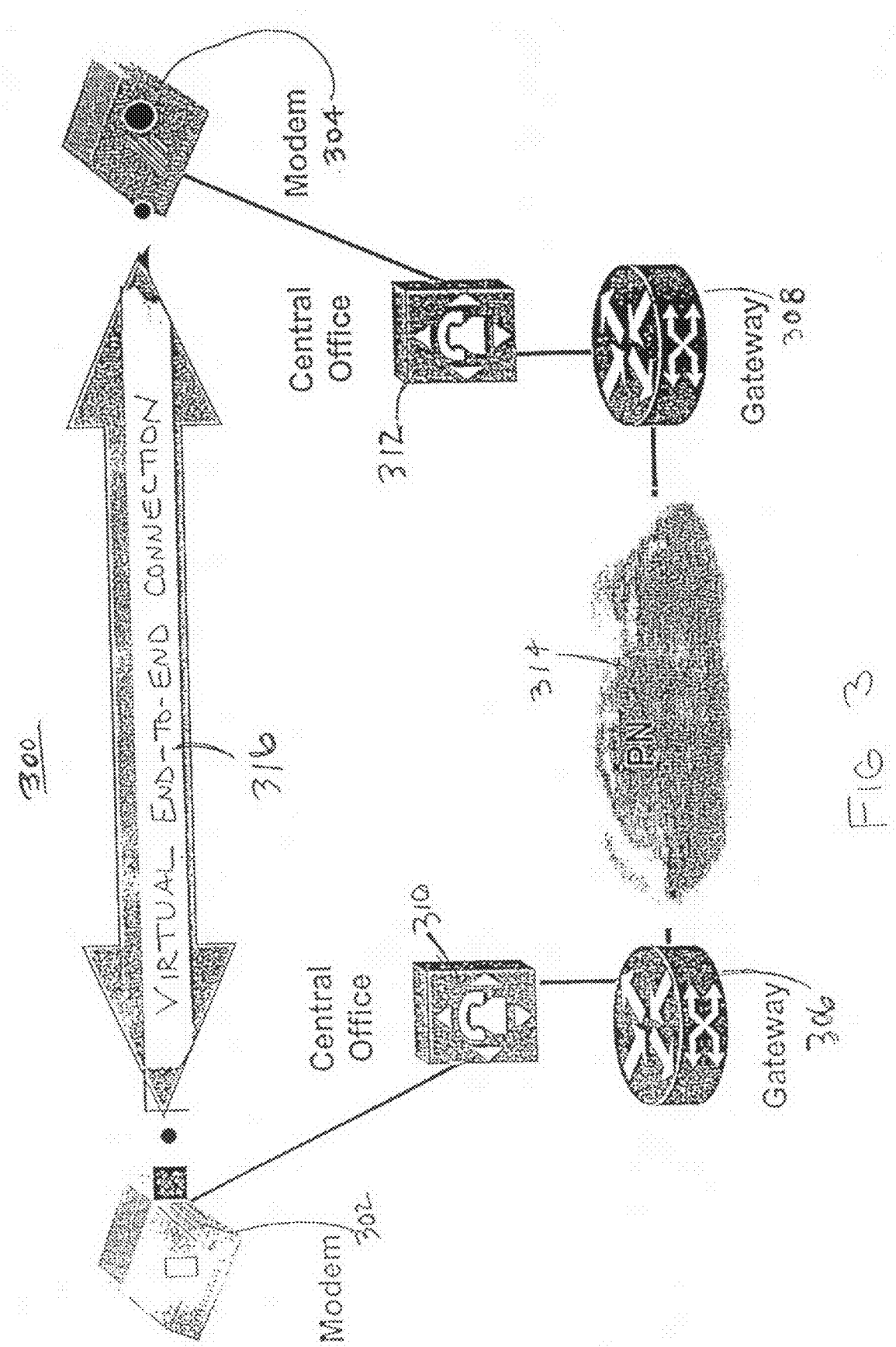
FIG. 3 is a schematic representation of an exemplary PN infrastructure providing an end-to-end connection for communicating between two modems in accordance with an exemplary embodiment of the present invention.

With reference to FIG. 3, in accordance with an exemplary embodiment of the present invention, a data communication system 300 comprises terminal devices 302 and 304, gateways 306 and 308, and a packet network 314. Terminal devices 302 and 304 suitably comprise any device configured to facilitate remote communications by users, for example, telephone, fax machines or modems. In accordance with an illustrative embodiment which will be used to provide a more detailed description of the present invention, terminal devices 302 and 304 suitably comprise modems. Modems 302 and 304 could comprise, for example, any client modem or any server modem in any remote access configuration. Further, although only two modems 302 and 304 are illustrated, modems 302 and 304 each could comprise a plurality of modem devices and the like. Moreover, although modem 302 will frequently be described as the device initiating a call session with modem 304, the call session can also be initiated by modem 304 to contact modem 302.

Gateways 306 and 308 suitably comprise any device configured to facilitate communication of data through packet network 314. Moreover, gateways 306 and 308 are suitably configured to interface with corresponding modems 302 and 304, e.g., gateway 306 with modem 302 and gateway 308 with modem 304, to facilitate the transmission of modem data through packet network 314. Further, gateways 306 and 308 may be configured to interface with any number of additional modem devices such that any one of modems 302 or 304, or any combination thereof, could communicate with the additional modems via packet network 314.

In accordance with this embodiment, gateways 306 and 308 suitably comprise gateway modems. However, gateways 306 and 308 can comprise any device configured to facilitate communications between 302 and 304 over packet network 314. Preferably, gateway 306 and 308 are suitably configured to demodulate data received from modems 302 and 304, transport the data information over packet network 314, and then remodulate the data for transferring to the corresponding modem 302 or 304. In addition, gateways 306 and 308 are suitably configured to communicate through packet network 314 such that gateway 306 can notify gateway 308 of its intent to establish a connection to corresponding modem 304, while gateway 308 can notify gateway 306 of its intent to establish a connection to corresponding modem 302. Further, gateways 306 and 308 can also include adaptive jitter buffers and the like as well as other flow control mechanisms, as will be described in more detail below, to facilitate more efficient data communications over packet network 314.

In addition, the packet data may be digitized within a circuit switched telephone network prior to arrival at gateways 306 or 308. However, the packet data may also be digitized within the gateway, such as a residential gateway installed for the client or end-user.

Packet network 314 suitably comprises any conventional packet network for modem to modem communications. Further, packet network 314 can be configured for a variety of communication protocols, such as, for example, Voice over IP (VoIP), Voice over Frame Relay (VoFR), Voice over ATM (VoATM), T.37 or T.38, and the like.

Having described the basic structure of data communication system 300, an example of the operation of system 300 can now be provided. Initially, for example, modem 302 may suitably contact gateway 306, such as, for example a gateway modem and the like, signifying gateway 306 of its intent to connect to remote modem 304. Gateway 306 will suitably contact the appropriate gateway 308, i.e., the gateway associated with modem 304, and notify gateway 308 of its intent to establish a connection to modem 304. Preferably, gateway 308 will then establish a communication link with modem 304. Moreover, additional negotiations can preferably happen between modem 302 and gateway 306, modem 304 and gateway 308, and/or between gateways 306 and 308, such that a communication session will be established wherein gateways 306 and 308 may act in proxy of modems 302 and 304, i.e., gateways 306 and 308 can suitably represent modems 302 and 304 during communication sessions.

After establishment of the communication session, modems 302 and 304 may then suitably transfer information to each other through gateways 306 and 308. Preferably, any information received from modems 302 and 304 by gateways 306 and 308 is demodulated and transported over packet network 314 between gateways 306 and 308. Moreover, information received by gateways 306 and 308 can be suitably remodulated and transferred to corresponding modem 302 or 304. The demodulation and remodulation of data can be suitably performed with gateways 306 and 308, or can be provided by other known means for providing the demodulation and remodulation of data. Further, the demodulation and remodulation of data can be performed by any techniques now known or hereinafter devised. Accordingly, modems 302 and 304 can effectively behave as if directly connected to each other, unaware of any modifications to data and/or protocols in their communication connection, i.e., a "virtual" end-to-end connection 316.

Figure 4:
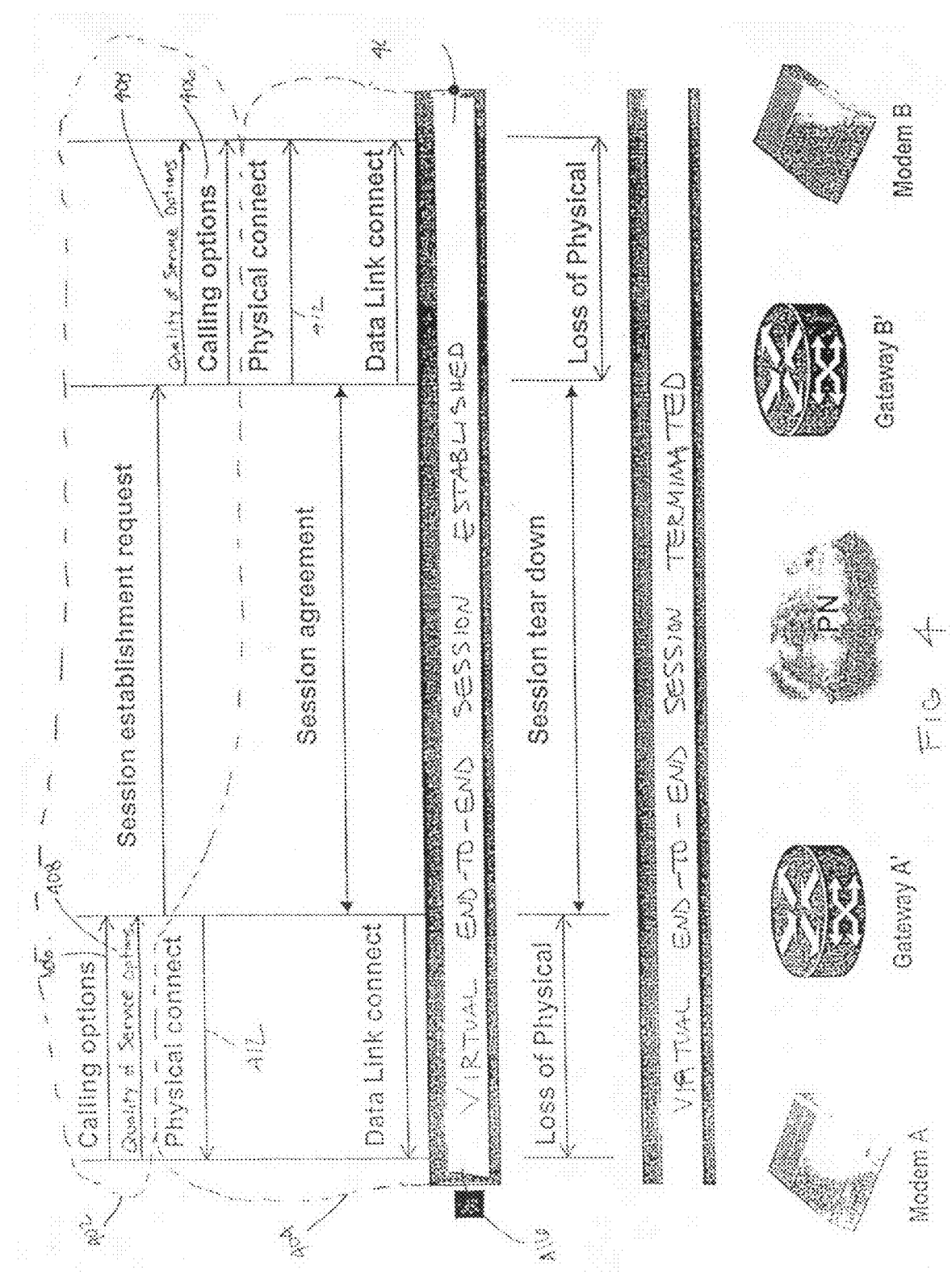
FIG. 4 is a flow diagram of an exemplary establishment and termination of a communication session in accordance with an exemplary embodiment of the present invention.

Having described an exemplary structure and operation of data communication system 300, a more detailed explanation of the establishment of an exemplary communication session in accordance with various embodiments of the present invention will now be discussed. In accordance with a preferred embodiment, with reference to FIG. 4, an exemplary communication session suitably includes a call initiation phase 402 and a call establishment phase 404. Call initiation phase 402 suitably comprises the process of initial communications between an initiating modem, such as modem 302, to a gateway, such as gateway modem 306, to preferably establish a communication session with a particular modem, such as modem 304.

Calling Options

During call initiation phase 402, modem 302 can be prompted to connect to gateway 306 to communicate various calling options 406, including, for example, the telephone number associated with the appropriate modem 304 for gateway modem 306 to contact during negotiations, and quality of service (QoS) options 408, if desirable.

With reference again to FIG. 3, data communication system 300 may also comprise central offices (CO) 310 and 312. Central offices 310 and 312 are suitably configured to facilitate communication negotiations between modems 302 and 304 and gateways 306 and 308. For example, modem 302 can indicate to central office 310 the corresponding gateway, such as gateway 306, that it desires to call. Accordingly, modem 302 and gateway 306 can start negotiating using negotiation techniques such as, for example, V.8bis and the like. In this example, V.8bis protocols are preferred over V.8 protocols in that V.8bis suitably provides a more generic means of passing information than V.8, including the ability to pass information after the establishment of the session. In addition, the negotiation process can also consider various parameters, such as, for example, the type of device, the manufacturer, the quality of service, or the phone number for contacting modem 304. Thereafter, any calling number options 406 and any quality of service options 408 may then be conveyed to gateway 306.

Central offices 310 and 312 can also include various aspects of intelligence. For example, central office 310 may be suitably programmed to recognize that certain calls coming from a party through modem 302 should be directed to gateway 306 transparently, i.e., without any notification of a specific phone number for gateway 306. Further, during call setup, for instance, mechanisms such as in-band signaling, out-of-band signaling, signaling system 7 (SS7), i.e., the international standard for PSTN signaling, and the like can be provided from central office 310 to make gateway 306 aware of the ultimate destination of a call from modem 302. Furthermore, by using a mechanism such as SS7, gateways 306 and 308 can exchange capabilities derived from the V.8bis indications.

In addition, data communication system 300 may comprise a plurality of additional central offices suitably configured to communicate with gateways 306 and/or 308. Moreover, central offices 310 and 312 can suitably communicate with modems 302 and 304 and gateways 306 and 308 through various techniques, protocols and communication methodologies, and is not limited to any one such communication link.

Additional calling options are also available for modems 302 and 304, such as the use of dual-tone multi-frequency (DTMF) signals. Accordingly, modem 302, or any additional equipment representative of modem 302, such as, for example, a redialer, can dial an access number, wait for a secondary dialtone, and then transmit the destination number and/or billing information using DTMF signals to gateway 306.

Call Establishment

After conducting of call initiation phase 402, data communication system 300 may conduct call establishment phase 404. Preferably, call establishment phase 404 suitably employs a physical link connection 412 and optional additional protocols such as, for example, a data link protocol or a V.80 protocol and the like. In accordance with an exemplary embodiment, the use of additional protocols can be preferably determined by first assessing the capabilities supported by the two terminals of a given communication segment, such as modems 302 and 304, and then deciding from a shared set of supported protocols between the two terminals which particular protocols are more desirable to use.

Moreover, this selection of additional protocols can be achieved using various methods, such as, for example, by forcing a specific protocol for operation. This forced protocol could be based on any number of actors. For example, the forced protocol could be selected by determining which protocols have been most frequently used between modems similar to modems 302 and 304. In addition, the selection of additional protocols can be achieved by accepting the first encountered common protocol and/or the like between modems 302 and 304.

In accordance with an exemplary embodiment, various communication session configurations are available for call establishment phase 408, including virtual end-to-end sessions 416 based on segments of transmissions independent of each other, and virtual end-to-end sessions 416 where all the segments build a virtual connection between two end points.

Independent Segments

Call establishment phase 404 may be comprised of a virtual end-to-end session 416 having independent segments. In accordance with this aspect, client modems 302 and 304 and gateway modems 306 and 308 preferably agree pairwise, i.e., agree per segment, such as between modem 302 and gateway 306, on the same set of specific reliable data link protocols. These agreed upon data link protocols could include, for example, a V.42 data link layer, over and above any physical link protocol. As such, when such a reliable transport protocol like V.42, for example, is in use on packet network 314, end-to-end virtual session 416 can comprise independent connection segments relaying information between modems 302 and 304 and gateways 306 and 308.

For example, where data link protocols such as V.42 and the like are suitably provided between modem 302 and gateway 306, a reliable transport protocol exists between gateway 306 and gateway 308, and data link protocol V.42 is utilized alone between modem 304 and gateway 308, virtual end-to-end connection 416 suitably comprises three independent segments: the connection between modem 302 and gateway 306, the connection between gateways 306 and 308, and the connection between gateway 308 and modem 304. Accordingly, modem 302 and gateway 306 may be preferably configured to detect, correct, and/or retransmit erroneous data on their respective segment independently of any other errors in other segments, e.g., any errors between gateways 306 and 308. Moreover, since both modem 302 and gateway 306 could support data compression in a data link protocol, such as V.42, both modem 302 and gateway 306 are further able to compress the data on this data link independent of any other segment and further, transparently to the other segments. In accordance with an exemplary embodiment, gateway 308 and modem 304 could be configured to only support error correction protocol MNP2-4, i.e., no data compression using V.42 may be achieved on the segment between gateway 308 and modem 304. Moreover, any data sent by modem 302 and gateway 306 would preferably be error corrected using one specific protocol over this segment, would preferably be reliably transported between gateways 306 and 308, and would be error-corrected using another specific protocol between gateway 308 and modem 304. Accordingly, the connection between modem 302 and gateway 306, and the connection between gateway 308 and modem 304 could suitably include the same data link protocol, e.g., transparent operation, different data link protocols, or no data link protocols. Further, the connection between modem 302 and modem 304 could suitably utilize a data link protocol from end-to-end without terminating the protocols used in gateways 306 or 308.

Virtual Connections

On the other hand, when a non-reliable transport protocol, such as, for example, a UDP best effort protocol, is provided between gateways 306 and 308, error correction may not be enabled on gateways 306 and 308, as loss of information by the transport protocol could go undetected by modems 302 and 304 and thus propagate to the upper protocol layers. In other words, both modems 302 and 304 transmit the data assuming the data is reliable, whereas instead the data is actually corrupted due to the loss of packets, and hence loss of information in packet network 314. Accordingly, the loss of a packet that goes undetected can corrupt the resulting transported data if no intermediate protocol is able to detect it, thus potentially having significantly negative consequences depending on the application and the amount and type of lost data. Accordingly, virtual end-to-end session 416 may comprise a virtual connection between modems 302 and 304, with any intermediate segments, such as between gateways 306 and 308, passively transporting the data destined to one or the other of modems 302 and 304, i.e., the data is demodulated/remodulated but not error-corrected within the segments 302-306 and 304-308. Although modems 302 and 304 are not physically attached to each other, the connection is deemed virtual because the virtual session is established between modems 302 and 304 for the given protocols, preferably including error correction protocols like V.42, and any commands issued between modems 302 and 304 may be transparently and passively transmitted by intermediate gateways 306 and 308.

Continuing in accordance with this aspect, virtual end-to-end connection 416 is particularly feasible if both modems 302 and 304 support a given set of protocols and agree on which protocol(s) to use. In accordance with this aspect, call initiation phase 402 with modem 304 preferably takes place before the call initiation phase 402 is suitably completed between modem 302 and gateway 306.

Figure 6:
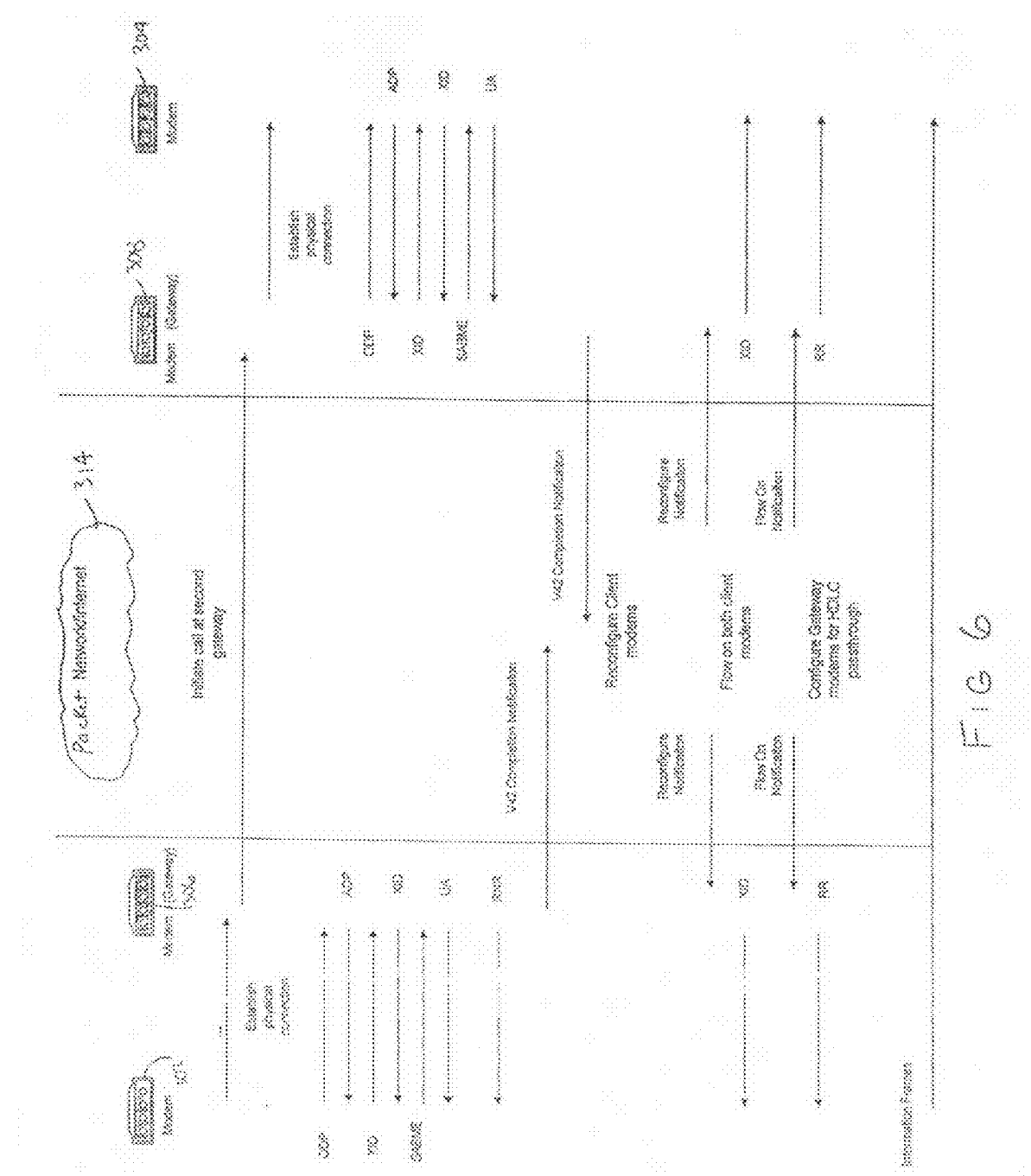
FIG. 6 is a flow diagram of an exemplary operation for the establishment of data link layers and reconfiguration of modems in accordance with an exemplary embodiment of the present invention.

In accordance with another exemplary embodiment, with reference to FIG. 6, virtual end-to-end connection 416 may include the initial establishment of data link layers between modems 302 and 304 and their respective gateways 306 and 308 in a traditional fashion, i.e., until the end of parameter negotiations when SABME/UA frames are exchanged, with a later reconfiguration of modems 302 and 304 after the establishment of the data link. In accordance with this embodiment, an illustrative example of a data link establishment process is described below.

Initially, gateway modem 306 receives a local call from modem 302. Next, the local call is answered and gateway 306 signals to remote gateway 308 to contact modem 304. Modem 302 and gateway 306 may then establish a physical connection and start to negotiate a protocol, such as V.42. Independently and in parallel with these negotiations, gateway 308 and modem 304 can establish a physical connection and conduct similar negotiations. However, it should be noted that control over the pace of process of establishment of the physical connection may be realized to further ensure that the subsequent protocol negotiations can be performed in parallel by the respective modems and gateways.

During the negotiations for modem 302 and gateway 306, any working parameters for the link between modem 302 and gateway 306, such as those parameters defined in the ITU-T V.42 Recommendation, are decided during a protocol establishment phase. In the illustrative example, modems 302 and 304 exchange XID frames, which are used to exchange general identification functions, to agree upon the working parameters for the communication segments for modem 302 to gateway 306 and for modem 304 to gateway 308. The working parameters negotiated can include standard protocols, such as, for example, K, N401 and HDLC optional functions, either alone or in combination.

The K parameter indicates the preferred window size, i.e., the number limit of unacknowledged I (data) frames that can be present on the communication segments. Once this limit is reached, the transmitting modem, such as modem 302, will cease sending further I (data) frames until an acknowledgment for previously transmitted I (data) frames is received. Moreover, two K values are preferably negotiated, including one for the transmitting direction and one for the receiving direction. The N401 parameter indicates the maximum I (data) frame payload size. Preferably, two N401 values are again negotiated, one for transmitting one for receiving. The HDLC optional functions can include such determinations as whether the SREJ (selective reject) function should be used, whether a 16 or 32 bit FCS (Frame Check Sequence, also known as a Cyclic Redundancy Code) should be used to determine the integrity of a frame, or whether TEST frames can be used.

Continuing in accordance with the illustrative example for a data link establishment process, gateway modem 306 immediately sends a command/response Receive Not Ready (RNR) frame to modem 302. The RNR frame, such as provided by gateway 306 using V.42 protocol, is received by modems 302 or 304 to identify that a busy condition exists and that gateway 306 is not ready to accept additional I (data) frames. This RNR frame suitably prevents modem 302 from transmitting any data until the second part of the communication link between gateways 306 and 308 is established. Likewise, gateway 308 and modem 304 establish a physical connection and negotiate a protocol, such as V.42. Further, gateway 308 then preferably sends an RNR frame to modem 304.

During this connection and negotiation period, it is possible that the connection between modem 302 and gateway 306 may have been negotiated to use different parameters than the connection between modem 304 and gateway 308. Accordingly, it may be preferable to harmonize the working parameters by sending further XID frames. XID frames are preferably used to exchange general identification functions between modem 302 and gateway 306 or modem 304 and gateway 308. XID frames are used in the V.42 protocol for the negotiation of parameter values and optional procedures between modem 302 and gateway 306 or modem 304 and gateway 308. In the event the communication links between modem 302 and gateway 306 and between modem 304 and gateway 308 have negotiated different working parameters, further exchanges of XID frames will occur until the working parameters are harmonized.

Once the parameters are harmonized, Receive-Ready (RR) frames can be sent to both modems 302 and 304, and thus permit user data transfer to begin. RR frames are used to indicate that modem 302 or 304 is ready to receive more frames, and thus will suitably clear a previous busy indication. In other words, the busy condition was flagged using a RNR frame as the initial working parameters were being negotiated. After negotiations, sending a RR (receiver ready) frame enables modems 302 and 304 to start transmitting user data in I (data) frames. Concurrently, as soon as the RR frames are sent to modems 302 and 304, gateways 306 and 308 suitably complete the V.42 procedure, and become suitably configured to pass data information, such as, for example, V.42 high-level data link control (HDLC) frame information, across packet network 314 in data packets. Any data packets received from packet network 314 can be suitably converted into HDLC frames and sent to modems 302 and 304. Thereafter, any information frames can be suitably passed from modem 302 to modem 304. Although an exemplary protocol is described, it should be noted that other protocols having similar parameters can be utilized in accordance with various embodiments of the present invention, and such similar parameters can be handled by means similar to that described above.

In addition to the data link illustration described above, another example of virtual end-to-end connection 416 includes the configuration of modems 302 and 304 as devices that do not use error-correction, such as videophones. In this example, a first videophone, e.g., an H.324-compliant videophone having a V.34 compliant modem with V.80 synchronous access mode, suitably attempts a communication with a second videophone through gateways 306 and 308. Preferably, modem 302 first connects with gateway 306, establishes a physical connection, and then occupies a "wait state" using mechanisms described further below. Thereafter, gateway 306 can preferably contact and notify gateway 308 of the need to contact modem 304 with a given set of capabilities, e.g., establish only a physical V.34 layer, and stall the negotiation of any further protocols until both gateways 306 and 308 are ready to complete the negotiation. Gateway 308 can then preferably contact modem 304, establish a physical connection, verify the capabilities of modem 304 in supporting the higher protocols utilized by modem 302, and then put modem 304 in a "wait state." Accordingly, gateways 306 and 308 preferably negotiate on behalf of modems 302 and 304 the set of protocols to be utilized, and then establish the connections with their respective modems 302 and 304.

Virtual End-To-End Physical Link Connection

In the event that at least one of modems 302 or 304 does not support a data link layer and the associated transport link is unreliable, a virtual end-to-end data link layer communication session may not be established. Alternatively, a virtual end-to-end physical connection may be established.

In accordance with this aspect, if the outcome of the initial handshaking process between modems 302 and 304 results in the lack of a terminal-to-terminal datalink protocol, modems 302 and 304 are preferably synchronized to avoid flow control problems. Since there may be no explicit mechanism that can be relied upon in this instance, the combination of gateways 306 and 308, and the associated protocols configured therewith, become responsible for buffering traffic to and from modems 302 and 304. As the adaptive jitter buffers within gateways 306 and 308 build up excessive data or become starved for data, due to either the selection of unequal data rates or slight mismatches in the precise data rates, gateways 306 and 308 can preferably compensate for this problem using two mechanisms. These mechanisms are mentioned further below in the description of flow control.

In accordance with another aspect of the present invention, gateway 308 and modem 304 may be configured to support a data link layer protocol, e.g., Link Access Protocol for Modems (LAPM). Moreover, V.42 will normally negotiate to use the LAPM protocol for transferring modem data. Accordingly, the segment of communication between gateway 308 and modem 304 may proceed independently of the characteristics of modem 302 and of its connection to gateway 306. However, any upper layer protocols, such as, for example, a point-to-point protocol (PPP) or an Internet Engineering Task Force (IETF) standard, present on both endpoint modems 302 and 304 may bring about a need for additional retransmissions.

Call Establishment Options

In addition, various other call establishment options other than those described above may be realized. In accordance with this aspect, modems 302 and 304 and gateways 306 and 308 may be configured to establish connections independently of the other modem-gateway schemes. However, there may exist instances where the capabilities of modems 302 and 304 need to be asserted before agreeing on a set of upper protocols. Preferably, in these instances, the handshaking process between modems 302 and 304 and corresponding gateways 306 and 308 is not completed at a given layer prior to the assessment of the capabilities of modem 302 and 304 and prior to the agreement between gateways 306 and 308.

Timing Considerations

During call establishment phase 404, critical timing considerations such as, for example, V.42 Originator Detection Patterns/Answerer Detection Patterns (ODP/ADP) may be addressed in order to avoid interpretation by the calling modem, such as modem 302, that its corresponding gateway, such as gateway 306, does not support a data link layer. In accordance with one aspect of the present invention, various options are available to resolve this dilemma. Moreover, these options can be utilized alone or in any combination to resolve these timing considerations.

For example, one option includes stalling the data link layer handshaking process between modems 302 and 304 and their corresponding gateways 306 and 308 until a virtual end-to-end connection has been established. Preferably, the duration of some portions of the actual modem training can be adjusted. If both modems 302 and 304 of virtual end-to-end connection 416 are attempting to train concurrently, for example, by communicating end-to-end, gateway modems 306 and 308 connected to the packet network side of the connection can manipulate the actual time of the transition to the data mode to be nearly simultaneous.

Another option in accordance with this aspect includes extending the timeout values for timers, such as ODP and ADP timers, that are used to determine whether a data link layer exists at modems 302 and 304. Preferably, the timeout values are extended for a period of time at least equal to that required for the establishment of virtual end-to-end session 416, such as, for example, 60 seconds. Accordingly, by negotiating the intention to operate in a Link Access Procedure for Modems (LAPM) protocol mode using V.8bis (or V.8 extensions) prior to the beginning of the actual modem training, any modems 302 and 304 that support these protocol extensions can agree to establish a synchronous protocol without timing out during the negotiation period.

Another option in accordance with this aspect includes using parameters such as V.8bis fields in the initial negotiation phase to force the choice of a data link layer protocol. Alternatively, parameters such as V.8bis fields could be used in the initial negotiation phase to indicate timer values that may be different from the default standard ones, e.g., T.400. Accordingly, if V.8bis negotiates a protocol connection in advance, timeouts can be eliminated.

Yet another option in accordance with this aspect includes creating a new protocol that would be supported by both modems 302 and 304 and their corresponding gateways 306 and 308. For example, such a protocol could be preferably determined during the initial negotiation phase. Additionally, such a protocol could be preferably determined using timers after the physical connection has been established, such as, for example, as in the case with connections employing V.42 protocols.

Still yet another option in accordance with this aspect includes having modems 302 and 304 start immediately with an attempt to establish a synchronous communications link using the ADP/ODP timer mechanism. Once the time-critical initial negotiation phase is complete, gateway modems 306 and 308 can then suitably pace the subsequent protocol negotiation phases awaiting confirmation that modems 302 and 304 will agree to a common protocol. In the event that no common protocol is chosen, the communication link can still negotiate a non-protocol connection even though the initial ADP/ODP handshake previously expressed some knowledge of the existence of synchronous protocols.

After any of the above options has been executed between modem 302 and gateway 306, modem 302 is suitably configured in a "wait state." The "wait state" can be any state or sequence of states involved in the modem training and protocol negotiation processes that can be used to delay the completion of the processes until the modem training and protocol negotiation can be done modem-to-modem. Meanwhile, gateway 306 preferably connects to gateway 308, establishes a point-to point session using adequate protocols (e.g., TCP/IP, H.323), and then provides gateway 308 with the number of the appropriate modem 304 to call. Accordingly, gateway 308 preferably calls modem 304, begins an initial negotiation phase, and then establishes a physical connection. Following the same mechanisms as for modem 302, modem 304 makes gateway 308 aware of its capabilities and suitably moves into a "wait state."

Figure 5:
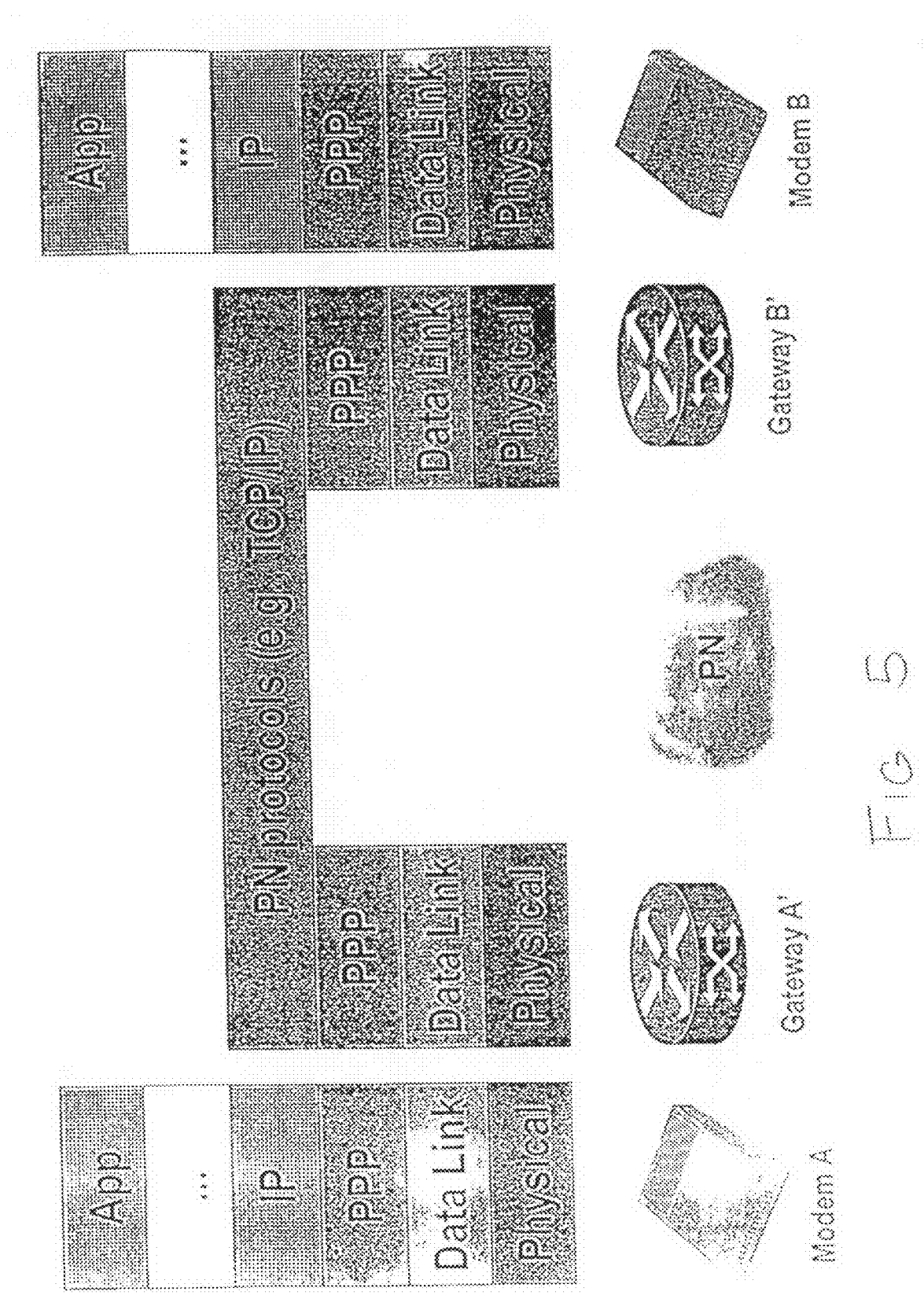
FIG. 5 is a schematic representation of an exemplary protocol stack combination as may be utilized for the end-to-end connection of FIG. 3.

As such, both modems 302 and 304 are preferably configured in a "wait state", and gateways 306 and 308 are configured to engage into an exchange of capabilities and further agree on the selection of protocols to be used with both modems 302 and 304, as described below. Moreover, gateway 306 can negotiate with modem 302 the selection of protocols and effectively represent modem 304 in this negotiation, and gateway 308 can do the same for modem 304, i.e., represent modem 302. Still further, the negotiations can then resume, upper protocol handshakes can be established, e.g, Point-to-Point protocol (PPP) IETF RFC1548 and Password Authentication Protocol/Challenge Authentication Protocol (PAP/CHAP), and virtual end-to-end connection 416 can be established. Accordingly, both modems 302 and 304 can then transmit and receive data on virtual end-to-end connection 416. For purposes of illustration, FIG. 5 depicts one possible protocol stack.

In accordance with another aspect of the present invention, gateway 306 may be configured to make gateway 308 aware of the capabilities of modem 302 and have gateway 308 force these capabilities on modem 304 if supported. Moreover, the data link layer connection may first be completed with the connections renegotiated later during call establishment if desired.

Gateway to Gateway Transport Protocols

Gateway to gateway transport mechanisms may be suitably selected from the capabilities of packet network 314 as configured with gateways 306 and 308. Preferably, at least two generic protocols can be supported, including reliable transport and best effort protocols. As discussed above, a virtual end-to-end connection with error detection, correction and retransmission mechanisms can provide for a more reliable and better performing end-to-end connection. Hence, it is preferable to use reliable transport protocols whenever possible.

Reliable Transport Protocols

A reliable transport protocol such as, for example, the Transmission Control Protocol (TCP) and the like, can provide for error detection, correction and retransmission mechanisms within packet network 314. When such a protocol is in place for the session between gateways 306 and 308, the virtual end-to-end session can be as reliable as a traditional PSTN session, even though packet losses in packet network 314 may create delays and hence reduce overall throughput. Accordingly, the virtual end-to-end session can effectively be then considered as three independent virtual connections, including modem 302 to gateway 306, gateway 306 to gateway 308, and gateway 308 to modem 304, with each virtual connection having independent but similar means of providing a reliable session.

Best Effort Protocols

Although it may be preferable to use a reliable transport protocol, a reliable virtual end-to-end session is feasible using a best-effort protocol if data link layer options are in use at both modems 302 and 304. In accordance with this aspect, a best effort protocol such as, for example, a UDP protocol, need not provide error detection, correction and retransmission mechanisms within packet network 314. In this case, the virtual link between gateways 306 and 308 may be deemed unreliable, and thus data transported over packet network 314 can be lost and not recovered. Any erroneous or missing data should be suitably detected by the end modems 302 and 304 if data link protocols are present. Accordingly, retransmission requests may be propagated back from receiving modem 304 to calling modem 302 using the best effort transport protocol, a behavior essentially equivalent to that of two end modems connected over a PSTN link.

Continuing in accordance with this aspect, it is also possible to use redundancy within a best effort protocol. For example, a UDP packet that carries packet A, B, C can be sent into packet network 314 to be routed, followed by a UDP packet that carries packet B, C, D, and so forth. Since the packets may take different routes in dynamic routing for congestion control, enough UDP packets may arrive to create an effective virtual loss-less connection, i.e., packet redundancy within a UDP packet can enable recovery from packet loss. Preferably, choice of the length of the redundancy should be optimized relative to the packet network dropped packet characteristics, for example, as may be dictated by the router buffer depths. Accordingly, the redundancy may improve the recovery from errors.

Quality of Service Considerations

As discussed above, modem 302 can be configured to connect to gateway 306 to communicate various quality of service options, if desirable. Quality of service considerations can arise from, among other things, service provisioning capabilities, different service rate options proposed by a service provider, or specific requirements set by higher level applications on modems 302 and 304. For example, a service provider may offer different bandwidth guarantees at different rates, and then allow the higher level applications of modem 302 or the end-user decide which bandwidth is more suitable. Another example could be a videophone application designed to work on a PSTN, e.g, an H.324 application, that could request a non error-corrected data link layer, e.g., V.80, and preferably a real-time protocol over a best-effort transport protocol on packet network 314, e.g., RTP on top of UDP.

These considerations can translate into quality of service mechanisms, e.g., RSVP diff-serve or int-serve requests and guarantees to the network elements that constitute packet network 314. Since these considerations can impact decision making by the various elements of the virtual end-to-end connection prior to the establishment of the connection itself, these considerations could be conveyed to gateways 306 and 308 at the initial negotiation phase using, for example, V.8bis proprietary fields.

Flow Control

Delays, drifts and jitters can occur in the flow of information on the virtual end-to-end session due to the characteristics of packet network 314 and because modem to gateway connections 302 to 306 and 304 to 308 are effectively independent of one another. Further, transmit and receive buffer space needs to be present at gateway modems 306 and 308 to account for small jitters in packet network 314. Preferably, the transmit buffer comprises a buffer containing data coming from modem 302 or 304 that is configured to be transmitted to the other modem through its corresponding gateway. Additionally, the receive buffer preferably handles data coming from a remote modem through its corresponding gateway. Accordingly, with buffer space on gateways 306 and 308 not being practically infinite, flow control mechanisms may need to be defined both between modems 302 and 304 and gateways 306 and 308, as well as between gateways 306 and 308.

Moreover, flow control between gateways 306 and 308 can be part of the transport protocols mechanisms, e.g., TCP. Further, flow control between modems 302 and 304 and gateways 306 and 308 can be achieved through either renegotiating of physical connect rates or disregarding of some data.

Physical Connection Renegotiations

In accordance with this aspect, the basic flow control mechanism between gateways 306 and 308 preferably relies on the detection of certain thresholds being reached in the buffers of gateways 306 and 308, and on the flow control information between gateways, i.e., inter-gateway. Based on the information extracted from the inter-gateway flow control, gateway 306 or 308 can renegotiate its physical connection rate with corresponding modem 302 or 304 to accommodate the situation encountered at the buffer level. For example, if the transmit buffer of gateway 305 reaches a "high" threshold indicating that the buffer might soon be overflowing, then gateway 306 can renegotiate its physical connection rate with modem 302 to a lower rate, effectively regulating its transmit buffer. Inversly, a transmit buffer underflow can indicate that the connection between modem 302 and gateway 306 is not fully utilized and thus can be increased. Accordingly, gateway 306 can then trigger a renegotiation with modem 302 to a higher rate. Preferably, a receive buffer is regulated through the flow control mechanisms provided by packet network 314 protocols.

Discarding of Data

In addition, modem to gateway flow control can be facilitated by discarding of some of the data. As discussed, traditional PSTN networks can be noisy, and thus data can be corrupted. Accordingly, the mechanisms that exist in the installed-base of modems, such as modems 302 and 304, to handle such "burst bit errors" can be used as an effective flow control mechanism. In other words, when a buffer overflow threshold is reached on gateway 306 or 308, the extraneous incoming bits can be discarded and hence not transmitted to modem 302 or 304. Accordingly, modem 302 or 304 can detect the error in the data flow and react to it as it would if it was a PSTN end-to-end connection.

Moreover, where practical, gateways 306 and 308 can head off an overrun or an underrun of data by forcing a rate renegotiation. However, in the event the rate renegotiations do not resolve this dilemma, the gateways can periodically insert a block of 1's to a buffer approaching an underrun condition or by periodically discarding a block of data in a buffer approaching an overrun condition. As such, any communication protocol capable of tolerating unprotected operation on an analog modem link may be able to recover from these conditions.

Having described various embodiments and features regarding call initiation, call establishment, and data transmission, termination of a communication session will now be described. In accordance with this aspect, termination of a communication session can be voluntary or accidental. An example of voluntary terminations may be when modem 302 terminates its session with modem 304, or when gateway 308 decides alone that it needs to terminate the connection between modems 302 and 304. An accidental termination is one by which any entity in the virtual end-to-end connection is unable to function properly, and causes the session to be terminated.

Termination by Terminal

If the session is terminated by, for example, modem 302, then modem 304 could wait indefinitely. Since such an indefinite waiting period can be an unwanted outcome, in accordance with an exemplary embodiment, a mechanism is provided such that when a physical connection between gateway 306 and modem 302 is torn-down, the connection between gateways 302 and 304 is also torn-down, and thus the connection between remaining gateway 308 and associated modem 304 is further torn-down as well. In other words, once a modem communication session involving gateway 302 or 304 is torn-down, for example, the communication link between modem 302 and gateway 306, the corresponding packet network 314 connection (e.g., TCP/UDP) will also need to be torn down. Further, once a connection for packet network 314 is torn down, then the corresponding modem session is torn down as well.

In accordance with a variation of the exemplary termination process, once the physical connection between modem 302 and corresponding gateway 306 is torn-down, gateway 306 may first notify gateway 308 of the session termination. Accordingly, this variation can provide for a faster notification of remaining modem 304, which can be a valuable feature if the communication is tarrified.

Termination by Gateway

If the session is terminated by, for example, gateway 306, then modem 302 should preferably terminate immediately. Accordingly, the same notification and session tear-down mechanisms described above may also apply to modem 304 and gateway 306.

The present invention has been described above with reference to various preferred embodiments. However, those skilled in the art will recognize that changes and modifications may be made to the preferred embodiment without departing from the scope of the present invention. For example, the various method steps may be implemented in alternate ways depending upon the particular application or in consideration of any number of functions associated with the operation of the system. In addition, the techniques described herein may be extended or modified for use with other components or hardware in a data communication system. These and other changes or modifications are intended to be included within the scope of the present invention.

We claim:

1. A method for use by a first gateway having a first gateway modem to establish data communication between a first modem and a second modem over a packet network, said method comprising:
receiving a call from said first modem over a first telephone line;
negotiating, in response to said call, over said first telephone line with said first modem to establish a first physical link connection;
informing a second gateway of said call over said packet network, said second gateway having a second gateway modem;
establishing a gateway-to-gateway transport link with said second gateway over said packet network;
determining a first set of data link parameters supported by said first modem and said first gateway modem;
requesting said first modem to enter a wait state after said determining of said first set of data link parameters;
negotiating by said first gateway with said second gateway, on behalf of said first modem and said second modem, respectively, to determine a final set of parameters supported by both said first modem and said second modem based on said first set of data link parameters and a second set of data link parameters, wherein said second set of data link parameters are supported by both said second modem and said second gateway modem;
sending, after determining said final set of parameters, a ready to resume message to said first modem by said first gateway modem indicating that said first gateway modem is ready to resume from said wait state;
establishing, after said sending of said ready to resume message, a first data link between said first gateway modem and said first modem over said first physical link connection using said final set of data link parameters;
configuring said first gateway modem for passively transporting first data link information received from said first modem over said first data link to said second gateway over said packet network, wherein said first data link includes a modem error correction, and wherein said passively transporting of said first data link information is a transportation performed without applying said modem error correction to said first data link information by said first gateway modem and said second gateway modem.

2. The method of claim 1, wherein said second gateway modem informs said second modem of said call over a second telephone line, and wherein said second gateway modem negotiates with said second modem over said second telephone line to establish a second physical link connection.

3. The method of claim 1, wherein said gateway-to-gateway transport link is an unreliable transport link.

4. The method of claim 1, wherein said first data link is based on ITU V.42 standard.

5. The method of claim 4, wherein said requesting said first modem to enter said wait state includes transmitting an RNR by said first gateway modem to said first modem.

6. The method of claim 5, wherein said ready to resume message is an RR transmitted by said first gateway modem to said first modem.

7. A first gateway capable of establishing data communication between a first modem and a second modem over a packet network, said first gateway comprising:
a receiver configured to receive a call from said first modem over a first telephone line;
one or more microprocessors configured to:
negotiate, in response to said call, over said first telephone line with said first modem to establish a first physical link connection;
inform a second gateway of said call over said packet network, said second gateway having a second gateway modem;
establish a gateway-to-gateway transport link with said second gateway over said packet network;
determine a first set of data link parameters supported by said first modem and said first gateway modem;
request said first modem to enter a wait state after said determining of said first set of data link parameters;
negotiate by said first gateway with said second gateway, on behalf of said first modem and said second modem, respectively, to determine a final set of parameters supported by both said first modem and said second modem based on said first set of data link parameters and a second set of data link parameters, wherein said second set of data link parameters are supported by both said second modem and said second gateway modem;
send, after determining said final set of parameters, a ready to resume message to said first modem by said first gateway modem indicating that said first gateway modem is ready to resume from said wait state;
establish, after said sending of said ready to resume message, a first data link between said first gateway modem and said first modem over said first physical link connection using said final set of data link parameters;
configure said first gateway modem for passively transporting first data link information received from said first modem over said first data link to said second gateway over said packet network, wherein said first data link includes a modem error correction, and wherein said passively transporting of said first data link information is a transportation performed without applying said modem error correction to said first data link information by said first gateway modem and said second gateway modem.

8. The first gateway of claim 7, wherein said second gateway modem informs said second modem of said call over a second telephone line, and wherein said second gateway modem negotiates with said second modem over said second telephone line to establish a second physical link connection.

9. The first gateway of claim 7, wherein said gateway-to-gateway transport link is an unreliable transport link.

10. The first gateway of claim 7, wherein said first data link is based on ITU V.42 standard.

11. The first gateway of claim 10, wherein said requesting said first modem to enter said wait state includes transmitting an RNR by said first gateway modem to said first modem.

12. The first gateway of claim 11, wherein said ready to resume message an RR transmitted by said first gateway modem to said first modem.

13. A method for use by a first gateway having a first gateway modem to establish data communication between a first modem and a second modem over a packet network, said method comprising:
receiving a first call from a second gateway over said packet network;
placing a second call, in response to said first call, over a first telephone line with said first modem to establish a first physical link connection;

establishing a gateway-to-gateway transport link with said second gateway over said packet network, said second gateway having a second gateway modem;

determining a first set of data link parameters supported by said first modem and said first gateway modem;

requesting said first modem to enter a wait state after said determining of said first set of data link parameters;

negotiating by said first gateway with said second gateway, on behalf of said first modem and said second modem, respectively, to determine a final set of parameters supported by both said first modem and said second modem based on said first set of data link parameters and a second set of data link parameters, wherein said second set of data link parameters are supported by both said second modem and said second gateway modem;

sending, after determining said final set of parameters, a ready to resume message to said first modem by said first gateway modem indicating that said first gateway modem is ready to resume from said wait state;

establishing, after said sending of said ready to resume message, a first data link between said first gateway modem and said first modem over said first physical link connection using said final set of data link parameters;

configuring said first gateway modem for passively transporting first data link information received from said first modem over said first data link to said second gateway over said packet network, wherein said first data link includes a modem error correction, and wherein said passively transporting of said first data link information is a transportation performed without applying said modem error correction to said first data link information by said first gateway modem and said second gateway modem.

14. The method of claim 13, wherein said gateway-to-gateway reliable transport link uses a different modem error correction than said first data link and said second data link.

15. The method of claim 13, wherein said first data link includes data compression.

16. A first gateway capable of establishing data communication between a first modem and a second modem over a packet network, said first gateway comprising:

a receiver configured to receive a first call from a second gateway over said packet network;

one or more microprocessors configured to:

place a second call, in response to said first call, over a first telephone line with said first modem to establish a first physical link connection;

establish a gateway-to-gateway transport link with said second gateway over said packet network;

determine a first set of data link parameters supported by said first modem and said first gateway modem;

request said first modem to enter a wait state after said determining of said first set of data link parameters;

negotiate by said first gateway with said second gateway, on behalf of said first modem and said second modem, respectively, to determine a final set of parameters supported by both said first modem and said second modem based on said first set of data link parameters and a second set of data link parameters, wherein said second set of data link parameters are supported by both said second modem and said second gateway modem;

send, after determining said final set of parameters, a ready to resume message to said first modem by said first gateway modem indicating that said first gateway modem is ready to resume from said wait state;

establish, after said sending of said ready to resume message, a first data link between said first gateway modem and said first modem over said first physical link connection using said final set of data link parameters;

configure said first gateway modem for passively transporting first data link information received from said first modem over said first data link to said second gateway over said packet network, wherein said first data link includes a modem error correction, and wherein said passively transporting of said first data link information is a transportation performed without applying said modem error correction to said first data link information by said first gateway modem and said second gateway modem.

17. The first gateway of claim 16, wherein said gateway-to-gateway reliable transport link uses a different modem error correction than said first data link and said second data link.

18. The first gateway of claim 16, wherein said first data link includes data compression.

* * * * *